US007920208B2

(12) United States Patent
Maracic et al.

(10) Patent No.: US 7,920,208 B2
(45) Date of Patent: Apr. 5, 2011

(54) METHOD, SYSTEM, AND APPARATUS FOR COMMUNICATION BY MEANS OF TRANSMITTED SIGNALS OVER VISUAL MEDIA

(76) Inventors: Mario Maracic, Zagreb (HR); Orsat Zovko, Zagreb (HR)

( * ) Notice: Subject to any disclaimer, the term of this patent is extended or adjusted under 35 U.S.C. 154(b) by 1213 days.

(21) Appl. No.: 11/463,387

(22) Filed: Aug. 9, 2006

(65) Prior Publication Data

US 2007/0035662 A1 Feb. 15, 2007

Related U.S. Application Data

(60) Provisional application No. 60/707,466, filed on Aug. 11, 2005.

(51) Int. Cl.
*H04N 7/00* (2011.01)
*H04N 5/44* (2011.01)
(52) U.S. Cl. .................. 348/473; 348/553; 348/564
(58) Field of Classification Search ........... 348/473, 348/476–479, 547, 552, 563–569, 723, 725, 348/513, 516, 553–554; 725/138, 21–23, 725/60, 113, 133, 141, 153; *H04N 7/00, H04N 5/44*
See application file for complete search history.

(56) References Cited

U.S. PATENT DOCUMENTS

| 3,829,095 | A | | 8/1974 | Baer |
| 3,993,861 | A | | 11/1976 | Baer |
| 4,613,904 | A | * | 9/1986 | Lurie ........................... 348/473 |
| 4,999,617 | A | | 3/1991 | Uemura et al. |
| 5,535,147 | A | | 7/1996 | Jacobs et al. |
| 5,652,602 | A | | 7/1997 | Fishman et al. |
| 7,075,583 | B2 | * | 7/2006 | Reynolds et al. ............ 348/473 |
| 7,650,624 | B2 | * | 1/2010 | Barsoum et al. ............. 725/138 |
| 2002/0014531 | A1 | | 2/2002 | Murphy |
| 2002/0031227 | A1 | | 3/2002 | Milgram |
| 2004/0125053 | A1 | | 7/2004 | Fujisawa |

FOREIGN PATENT DOCUMENTS

WO WO2004019442 3/2004

* cited by examiner

*Primary Examiner* — Trang U Tran
(74) *Attorney, Agent, or Firm* — Christine McLeod; Beusse, Wolter, Sanks, Mora & Maire, P.A.

(57) ABSTRACT

A communication method, system, and apparatus are provided that transmits supplementary communications combined with standard television or other visual media (e.g., cable, satellite, video, pre-recorded video, IPTV, Internet, print media) to a viewer/reader. The invention permits a standard television system or other visual media system to transmit supplementary digital data to the viewers along with the normal visual image to provide interactivity. The invention includes an electronic device that optically receives the transmitted supplementary digital data sent along with the visual image. Using the method described, a transmitting facility is able to transmit supplementary data to the device without interfering with its regular programming. The supplementary data can provide a means for added interactivity (e.g., by providing supplemental data for marketing, promotions, games, entertainment, education, coupons, and the like).

37 Claims, 9 Drawing Sheets

Simplified layout of the TV station control room

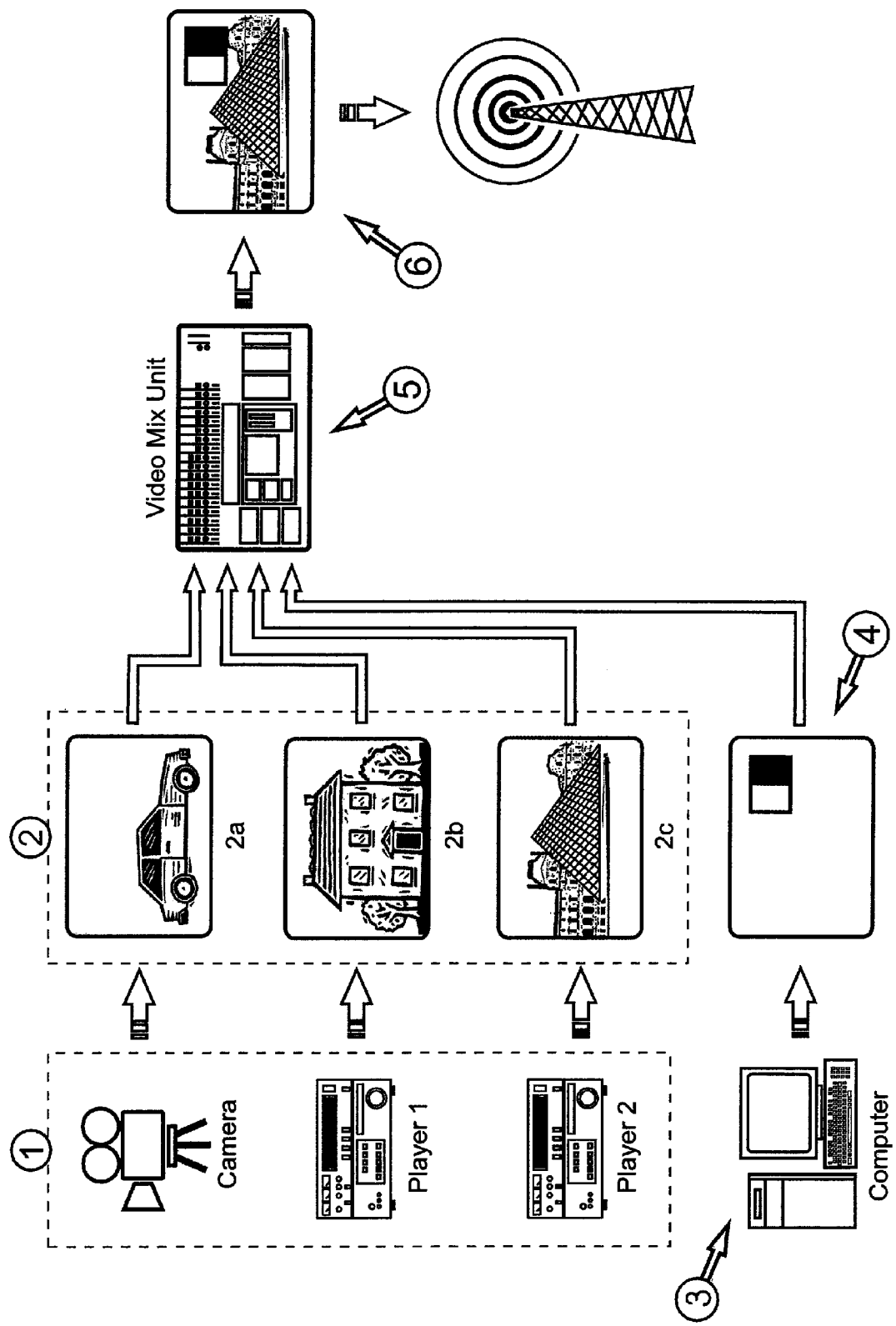
Figure 1 - Simplified layout of the TV station control room

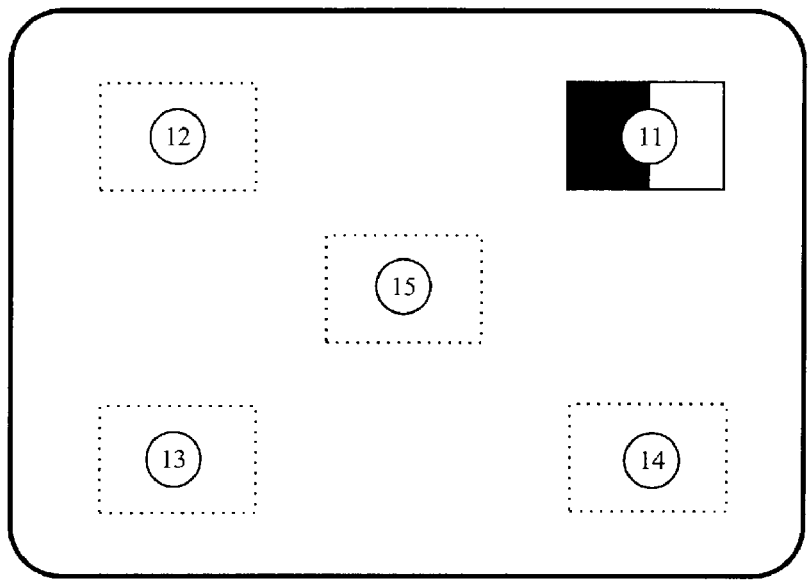
Figure 2a - Computer generated communication graphics
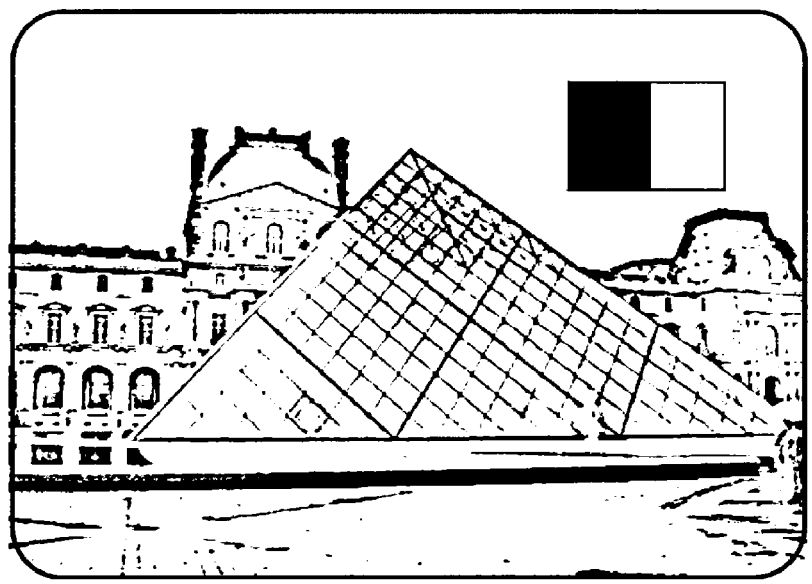
Figure 2b - Example of communication graphics positioning

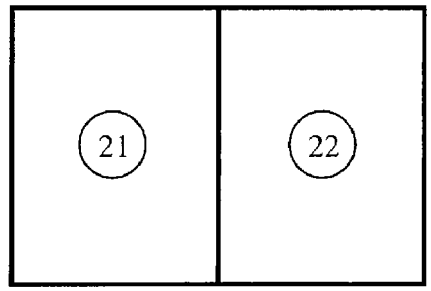
Figure 3a - communication graphics fields
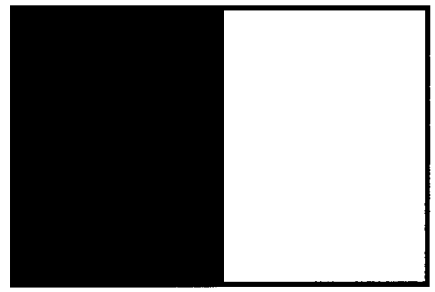
Figure 3b - Communication graphics - variant 1
Figure 3c - Communication graphics - variant 2

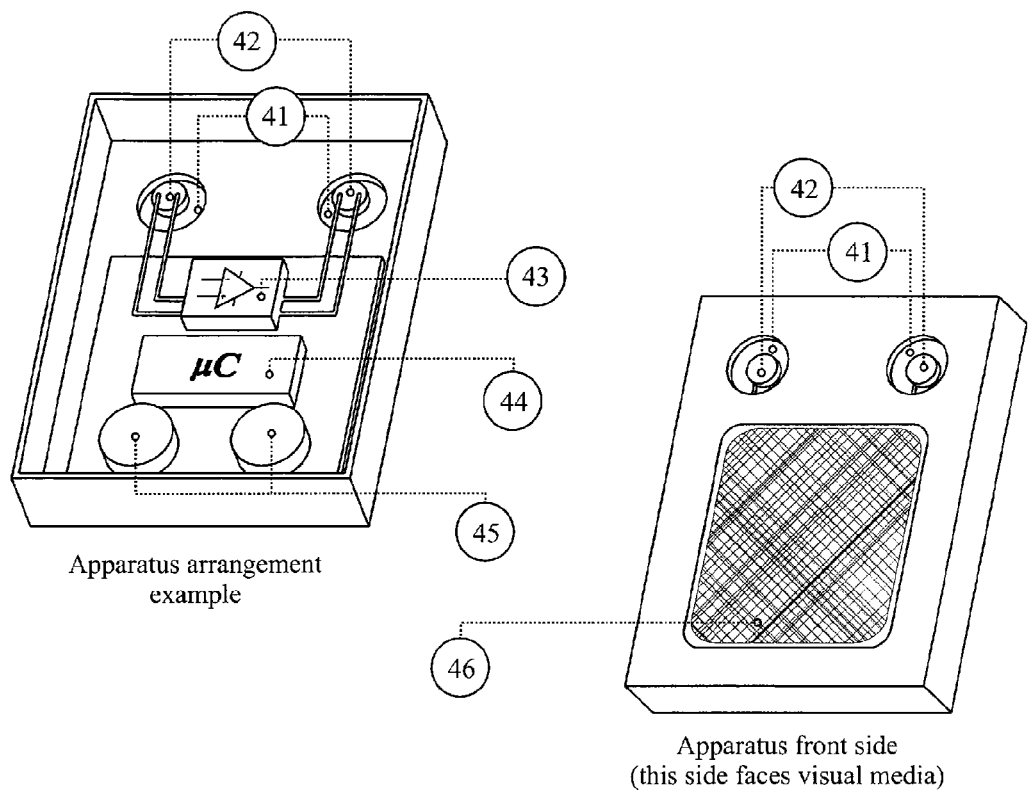
Figure 4a - Simplified apparatus layout
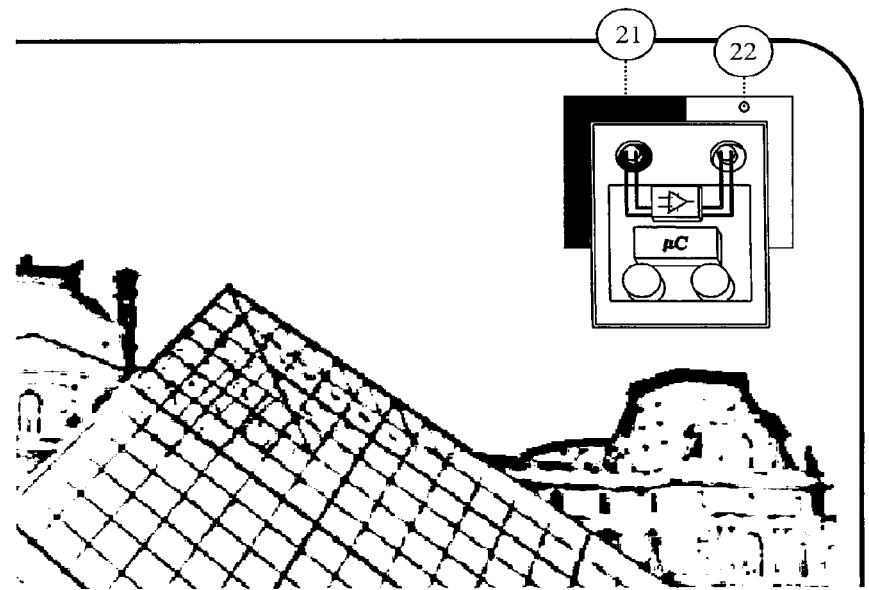
Figure 4b - example of apparatus positioning

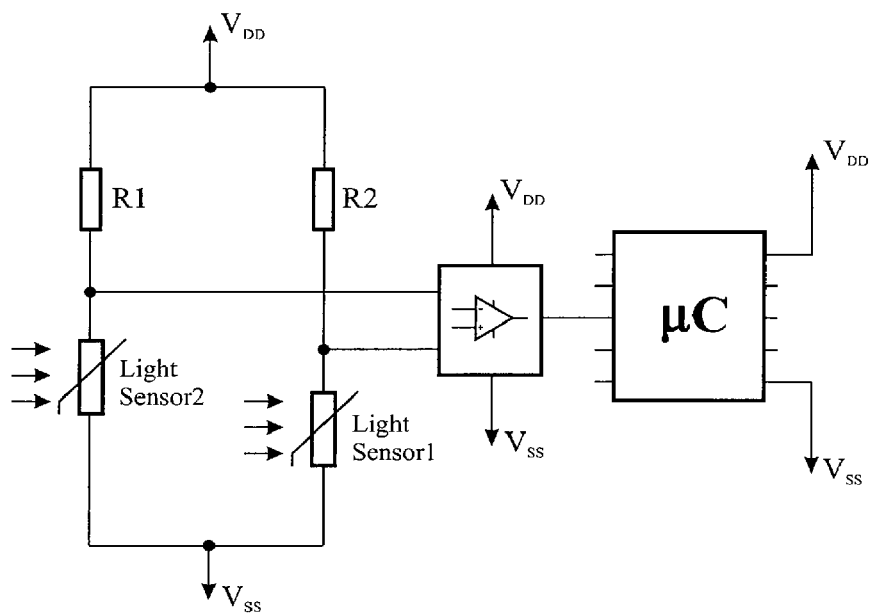
Figure 5a - basic electronic schematics of the apparatus
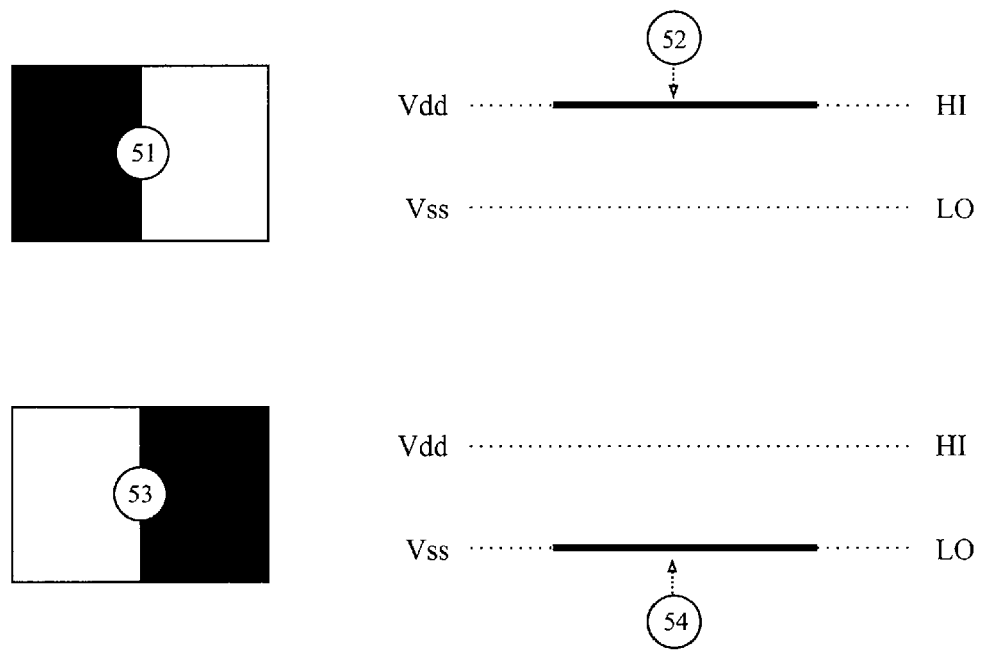
Figure 5b - effect of communication graphics variants

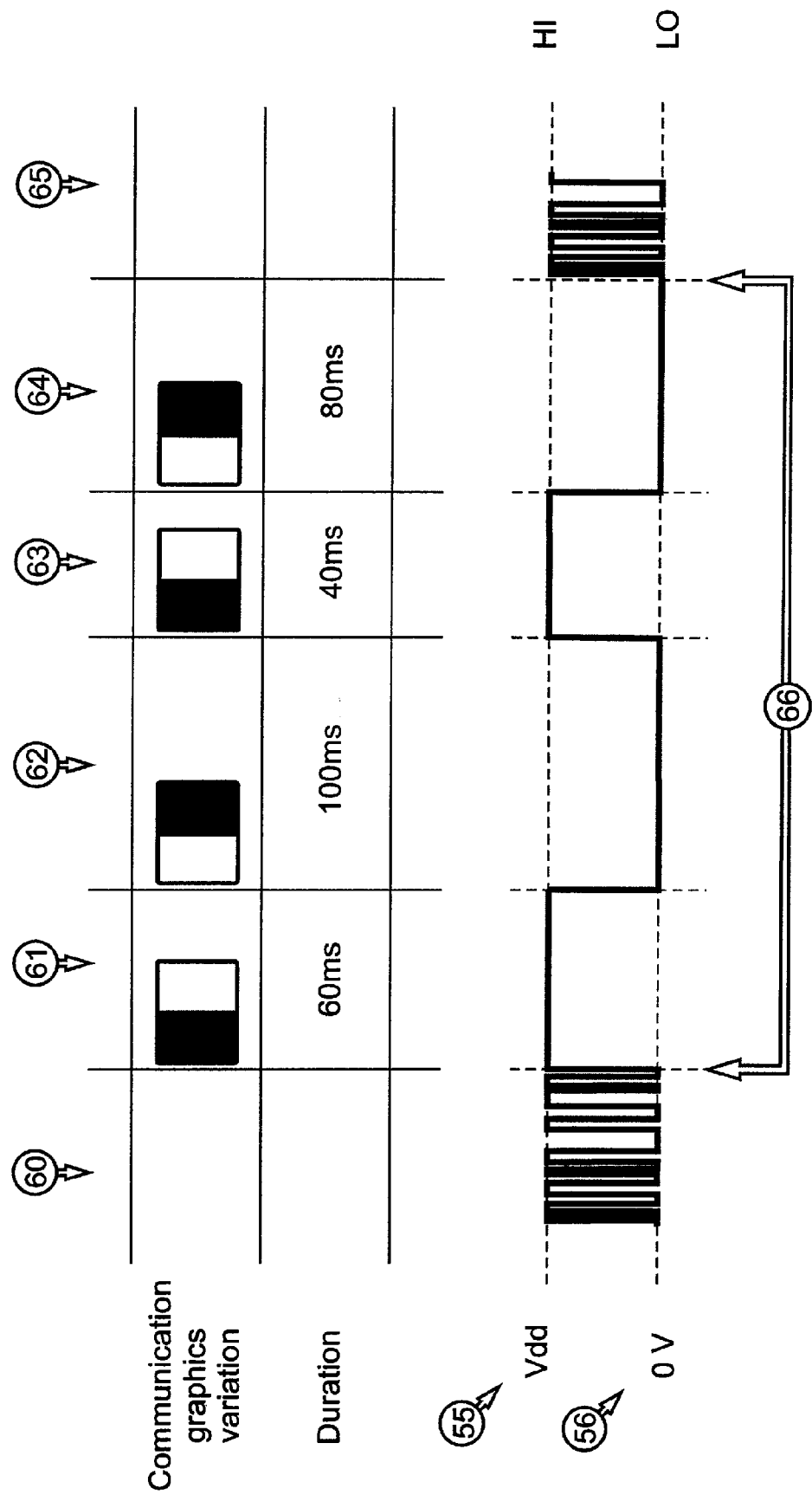
Figure 6 - Example of data transfer

Lorem Ipsum

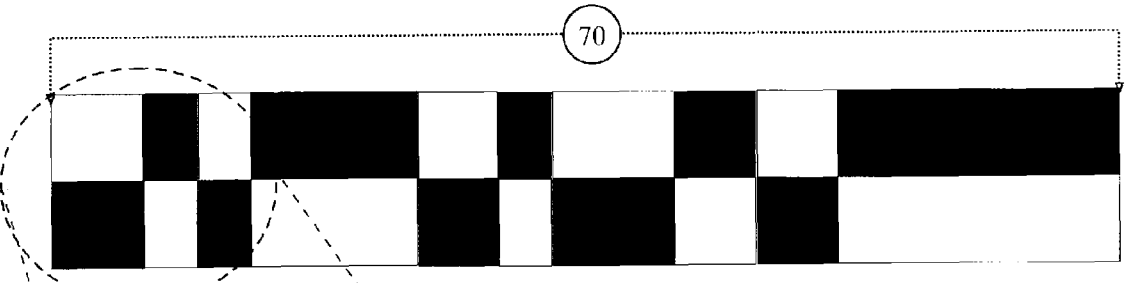

Lorem ipsum dolor sit amet, consectetuer adipiscing elit. Maecenas tristique purus sit amet sapien ultricies congue. Cras aliquam facilisis tellus. Sed fermentum augue non libero. Mauris consectetuer. Sed a sem in orci sollicitudin sodales. Cras eget elit. Integer erat. Pellentesque lectus velit, condimentum pellentesque, tristique fringilla, aliquam non, urna. Aliquam malesuada consectetuer justo. Curabitur in nisi at elit imperdiet interdum. In venenatis lectus eget nisi.

Phasellus sagittis, ligula vel imperdiet suscipit, eros purus pulvinar sem, ut auctor nibh tortor id pede. Morbi eu tortor ut justo facilisis interdum. Integer in ante sed neque commodo consequat. Ut eget ante et eros viverra semper. Donec condimentum, erat quis congue tincidunt, lectus nisl semper est, sit amet placerat tellus est id orci. Lorem ipsum dolor sit amet, consectetuer adipiscing elit. Vestibulum placerat odio sed sem hendrerit malesuada. Proin ac turpis. Etiam ullamcorper sagittis nibh. Cum sociis natoque penatibus et magnis dis parturient montes, nascetur ridiculus mus. Nulla facilisi. Vestibulum turpis dui, elementum vel, eleifend facilisis, semper

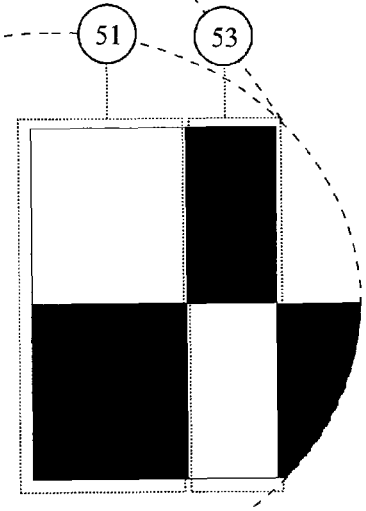

Figure 7 - Example of printed communication graphics

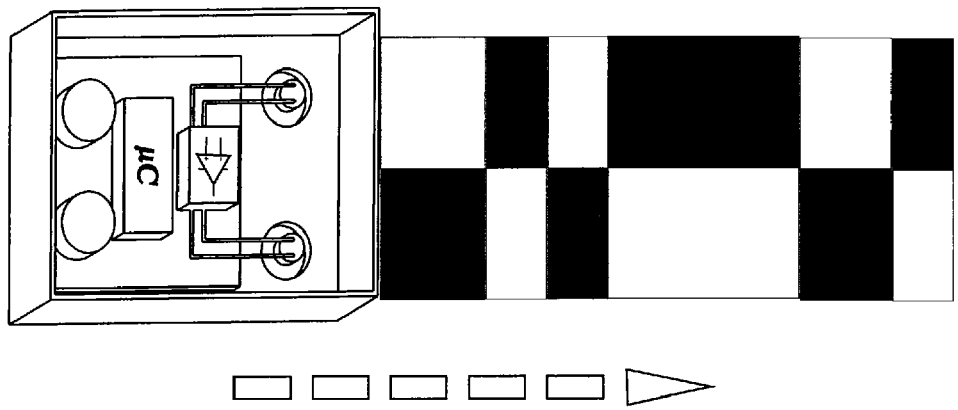
Figure 8a - Apparatus positioned over the communication graphics
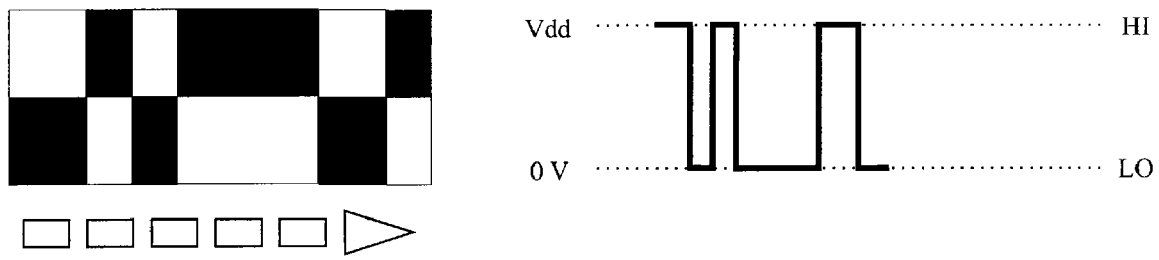
Figure 8b - Waveform resulting from a fast sweep
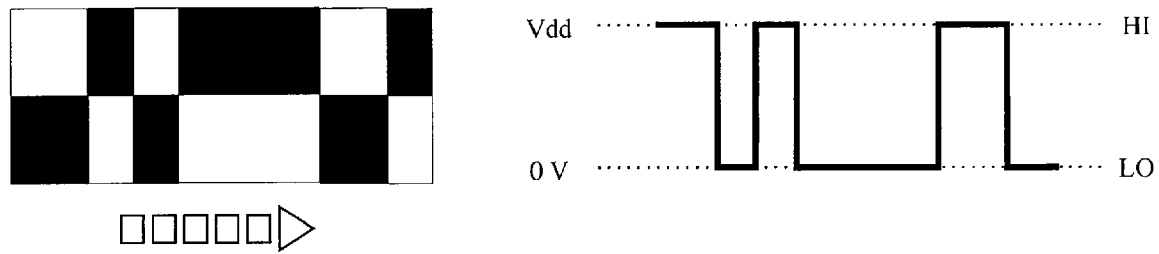
Figure 8c - Waveform resulting from a slow sweep

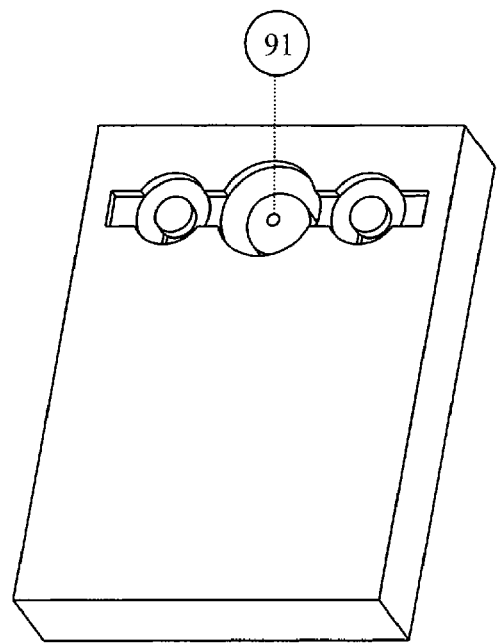
Figure 9a - Apparatus for use with print media - one light source
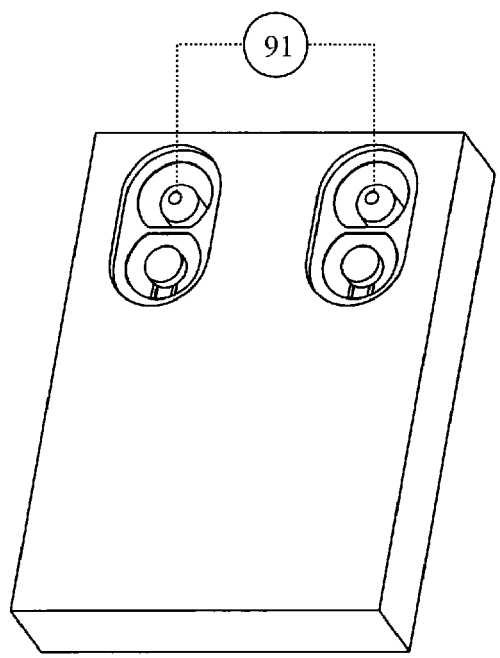
Figure 9b - Apparatus for use with print media - multiple light sources

METHOD, SYSTEM, AND APPARATUS FOR COMMUNICATION BY MEANS OF TRANSMITTED SIGNALS OVER VISUAL MEDIA

CROSS REFERENCE TO RELATED APPLICATIONS

This application claims benefit to U.S. Provisional Application Ser. No. 60/707,466 filed Aug. 11, 2005, incorporated herein in its entirety by reference.

COPYRIGHT NOTICE

A portion of the disclosure of this patent document, including Appendices, contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

1. Technical Field

This invention relates generally to supplementary communications combined with visual media such as standard television or other (e.g., cable, satellite, video, pre-recorded video, IPTV, Internet and print media as well). More particularly, it relates to a method, system, and apparatus that permit a standard television system or other visual media system to transmit supplementary digital data to the viewers along with the normal visual image. The invention includes an electronic receiving device that optically receives the transmitted supplementary digital data sent along with the visual image. Using the method described, the transmitting facility is able to transmit supplementary data to the device without interfering with its regular programming. The supplementary data can provide a means for added interactivity with the program (e.g., by providing data for games, entertainment, marketing, promotions and the like).

2. Background Art

Apparatus and communication method described have been developed in order to enable mass production of cheap, small and disposable self-contained receiving units that can be applied in various interactive marketing schemes that involve visual media. Advancement over existing patents reflects in versatility and efficiency of design and ease of usage of the apparatus as well as diversity of media that apparatus can be used with. Recently, interactive display systems utilizing television receivers have been designed. For example, U.S. Pat. No. 3,829,095, entitled "Method of Employing a Television Receiver for Active Participation," discloses a control unit having an output coupled to the antenna input of a television receiver. A device, coupled to an input of the control unit, is attached by a suction cup to the face of the television's CRT at the bottom center, and includes a photocell and a pickup coil. A white stripe is placed at the bottom of the CRT by a cooperative television station, and the device is used to obtain vertical and horizontal sync signals for use by the control unit to provide an output to the television receiver that is synchronized with the signal of the cooperative television station. The control unit then can be used for training simulation, playing games, and other purposes.

U.S. Pat. No. 3,993,861, entitled "Digital Video Modulation and Demodulation System," discloses a system broadly similar to that described in the previous paragraph, wherein there is generated a television picture signal that in addition to the usual video content has a data content provided as video information in one or more selected areas or cells of the picture. This composite television picture signal may be provided via prerecorded video tape or disc directly coupled to a television receiver or broadcast or distributed over a cable television system. The data are provided as binary-coded, digital brightness modulation at rates exceeding the vertical picture field rate. At the television receiver are positioned one or more light sensors opposite the cells, and the sensor outputs are sent to a decoder. The light sensor may be held in place by a suction cup. In operation of the system, the digital data received by the light sensor is stored in the decoder. The stored data is compared for a match with previously stored data, and may indicate the correct solution of a quiz question, for example. The system may be used for purposes that include interactive training, teaching, and entertainment.

A number of other patents exist which relate to digital transmissions combined with image transmission, including, U.S. Pat. Nos. 4,999,617, 5,535,147, and 5,652,602; all of which are incorporated herein by reference. It is important to stress that previously mentioned patents and alike might be designed to offer greater communication speeds or but are in comparison much more complicated to use and produce. Great part of mentioned patents will not work with newer display devices based on technologies such as LCD, TFT or Plasma because the lack of vertical or horizontal sync that can be detected optically. Most of the cited patents are constrained by vertical frequency and will not work across TV standards (PAL, NTSC, HDTV, etc.). Further, none of the cited patents is able to work with TV and print media at the same time. Relatively complicated technology that mentioned patents incorporate prevents mass production that could be cheep enough so the product may be given for free and used as a marketing tool.

DISCLOSURE OF THE INVENTION

In various embodiments, the present invention provides improvements over the systems described above. Broadly speaking, the present invention comprises a method, system, and apparatus that permit a standard television system or other visual media to transmit digital data to the viewers along with the normal visual image. The invention can be implemented in numerous ways, including as a system, a device/apparatus, and a method. Parts of the invention may exist on a computer readable medium.

As a method, an embodiment of the invention comprises a method for generating a video signal having supplementary information therein for coupling to a display device, said method comprising: (a) receiving supplementary information; (b) converting supplementary information into binary-coded data by constructing an optically readable image of at least two data cells, such that a logical 0 of binary-coded data is represented by cell one having a first optical representation and cell two having a second optical representation, and a logical 1 of binary-coded data is oppositely represented by cell one having the second optical representation and cell two having the first optical representation; and (c) generating a supplementary video signal comprising an image stream representative of said binary-coded data suitable for coupling to a display device for producing an image representative of said supplementary video signal. In another embodiment, the method of the invention further comprising combining a source video signal and the supplementary video signal to provide an output video signal suitable for coupling to a display device for producing an image comprising a first portion representative of said source video signal and a second portion representative of said supplementary video signal.

The first and second optical representations may comprise numerous representations. For example, they may comprise, respectively, approximate brightness variations (e.g., light and dark, bright and dim), or approximate color variations (black and white, green and yellow, blue and red). An embodiment of the method further comprises the step of optically decoding the optically readable image at the display device to ascertain the supplementary information. Preferably, the optically readable image is decoded by aligning optical sensors with the data cells and comparing the data from the optical sensors. The method may further comprise outputting decoded data representative of the supplementary information and/or processing the supplementary information.

In an embodiment, the supplementary video signal is formatted as a multimedia signal for transmission by radio broadcast, satellite, cable, computer network, or Internet and maybe transmitted live or pre-recorded.

The second portion representative of the supplementary video signal may overlay an area of the first portion representative of the source video signal on the display device. Preferably, the second portion is located on the least occupied part of the source video signal on the display device. Alternately, the second portion representative of the supplementary video signal is located in an area visually outside the first portion representative of the source video signal on the display device. Or, the second portion representative of the supplementary video signal is located in an area visually outside the first portion representative of the source video signal on the display device by first reducing the image size of the source video signal.

In an embodiment, the method further comprises additional data cells, thereby increasing the bandwidth of data being transferred. Preferably, when more than two cells are used, the first two data cells are encoded with opposite optical representations, thereby providing a dynamic reference.

In another embodiment, the invention comprises a method of interacting with viewers for a promotional campaign, comprising transmitting supplemental information associated with the promotional campaign in accordance with the method described above, the promotional campaign comprising one or more promotions of prizes, coupons, discounts, tickets, lotteries, and the like. The interaction comprises collecting the supplemental information by receiving and optically decoding the optically readable image at the display device with a receiver to ascertain the supplementary information. In some instances, the supplemental information can be collected for a predetermined length of time in order to satisfy the promotional campaign. Also, an output indication (e.g., audible or visual indicators) may be provided on the receiver upon collection of a predetermined amount of supplemental information. Moreover, an acknowledgement can be transmitted from the receiver to a third party upon collection of a predetermined amount of supplemental information and the third party can provide the promotion in return for the acknowledgement. Or, the receiver may be exchanged after supplemental information is collected for the promotion.

The invention may also be designed as a system for generating a video signal having supplementary information therein for coupling to a display device, comprising a means for receiving supplementary information; means for converting supplementary information into binary-coded data by constructing an optically readable image of at least two data cells, such that a logical 0 of binary-coded data is represented by cell one having a first optical representation and cell two having a second optical representation, and a logical 1 of binary-coded data is oppositely represented by cell one having the second optical representation and cell two having the first optical representation; and means for generating a supplementary video signal comprising an image stream representative of said binary-coded data suitable for coupling to a display device for producing an image representative of said supplementary video signal. The system may further comprise means for combining a source video signal and the supplementary video signal to provide an output video signal suitable for coupling to a display device for producing an image comprising a first portion representative of said source video signal and a second portion representative of said supplementary video signal.

In another embodiment, the invention can be described as a system for combining supplementary information into a video signal for coupling to a display device, comprising a digital converter for converting supplementary information into binary-coded data by constructing an optically readable image of at least two data cells, such that a logical 0 of binary-coded data is represented by cell one having a first optical representation and cell two having a second optical representation, and a logical 1 of binary-coded data is oppositely represented by cell one having the second optical representation and cell two having the first optical representation; and a signal generator for generating a supplementary video signal comprising an image stream representative of said binary-coded data; and a video mixer for combining a source video signal and the supplementary video signal to provide an output video signal suitable for coupling to a display device for producing an image comprising a first portion representative of said source video signal and a second portion representative of said supplementary video signal.

As a method for transmitting and receiving supplementary information in a video signal, the method comprises (a) receiving supplementary information; (b) converting supplementary information into binary-coded data by constructing an optically readable image of at least two data cells, such that a logical 0 of binary-coded data is represented by cell one having a first optical representation and cell two having a second optical representation, and a logical 1 of binary-coded data is oppositely represented by cell one having the second optical representation and cell two having the first optical representation; and (c) generating a supplementary video signal comprising an image stream representative of said binary-coded data suitable for coupling to a display device for producing an image representative of said supplementary video signal, and (d) combining a source video signal and the supplementary video signal to provide an output video signal suitable for coupling to a display device for producing an image comprising a first portion representative of said source video signal and a second portion representative of said supplementary video signal, (e) receiving said output video signal at said display device; and (f) optically decoding the optically readable image to ascertain the supplementary information.

The invention further includes an apparatus for reading two-dimensional code contained in a video signal displayed on a display device, comprising: an optical reader for capturing an optically readable image carrying supplementary information combined with a video signal, wherein the image comprises at least two data cells, such that a logical 0 of binary-coded data is represented by cell one having a first optical representation and cell two having a second optical representation, and a logical 1 of binary-coded data is oppositely represented by cell one having the second optical representation and cell two having the first optical representation; and a decoder for decoding the optically readable image.

Preferably, the apparatus is removeably attachable to the display device. The reader preferably comprises optical sensors for alignment with said data cells of the optically readable image on the display device. The decoder comprises a comparator for comparing the data from the optical sensors to determine the logical state represented by the data cells. The invention further includes an output device for outputting decoded data representative of the supplementary information. Also, a processor may be included for controlling output functions based on the supplementary information.

In another embodiment, the invention may be described as an apparatus for reading two-dimensional code contained in printed matter, comprising: an optical reader for capturing an optically readable printed image carrying supplementary information, wherein the printed image comprises at least two data cells, such that a logical 0 of binary-coded data is represented by cell one having a first optical representation and cell two having a second optical representation, and a logical 1 of binary-coded data is oppositely represented by cell one having the second optical representation and cell two having the first optical representation; and a decoder for decoding the optically readable image.

The invention may also be described as a method for communicating supplementary information in printed matter, said method comprising: (a) converting supplementary information into binary-coded data by constructing an optically readable printed image carrying supplementary information, wherein the printed image comprises at least two data cells, such that a logical 0 of binary-coded data is represented by cell one having a first optical representation and cell two having a second optical representation, and a logical 1 of binary-coded data is oppositely represented by cell one having the second optical representation and cell two having the first optical representation; (b) printing said optically readable printed image; and (c) optically decoding the optically readable printed image to ascertain the supplementary information.

Accordingly, it is an object of this invention to provide a data transmission system that permits a cooperating transmitting facility (e.g., television station) to send supplementary digital data to viewers of a television program originating at the facility without interfering with the normal TV image or if cooperating party is print media, i.e. newspaper, to incorporate supplemental digital data into newspapers.

It is a further object of this invention to provide a system of the above type which permits a transmitting facility to send supplementary data in the form of binary digital brightness modulations in selected areas of the television picture frame or printed page.

It is yet another object of this invention to provide this data to in an inexpensive and simple system comprising a transmitter at the transmitting facility and a receiver at the viewing location when television broadcast is in question, whereas transmitter is not needed with print media.

It is another object of this invention to accomplish all of these functions using a live, delayed, or prerecorded videotape or disc either for direct playback at the viewing location or for broadcast over TV, Cable TV, Internet, or satellite.

Accordingly, this arrangement permits the cooperating transmitting facility or taped program to communicate supplementary data to the program viewers in addition to the pictorial matter, without requiring any change in its normal operating procedures.

Further, the components of the system are readily installed at the transmitting facility and at the viewing location. Accordingly, the cost to the facility and the viewer of obtaining this additional capability should not be excessive if any.

One important feature of this invention is that it is in no way constrained by the TV standard and horizontal or vertical frequency of the display device, meaning it will work equally well with a 50-year old CRT TV set and with a brand new plasma device that has completely different way of creating screen image. Furthermore, presented method enables apparatus to work with printed sequence of communication graphics fields as well. To read the encoded information, the communication graphics has to be prepared and printed in certain way (discussed below) and apparatus slid over it. This versatility enables the apparatus to be applicable in a wide range of environments.

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 is a simplified layout of a transmitting facility control room and preferred hardware used to generate the supplementary data in the form of a communication graphics overlay.

FIG. 2a and FIG. 2b show positioning possibilities of the communication graphics area.

FIG. 3a, FIG. 3b and FIG. 3c provide a description of the communication graphics.

FIG. 4a and FIG. 4b illustrate a simplified apparatus layout and example of positioning apparatus on the screen.

FIG. 5a represents basic electronics schematics of apparatus

FIG. 5b illustrates the effect of communication graphics

FIG. 6 shows the basic concept of the presented data transfer.

FIG. 7 shows an example of communication graphics usage with print media

FIG. 8a depicts use of apparatus with printed media

FIG. 8b and FIG. 8c illustrate waveforms created by various sweeping speeds

FIG. 9a and FIG. 9b are examples of apparatus equipped with light sources

DETAILED DESCRIPTION OF THE PREFERRED EMBODIMENT

Referring now to the drawings, the preferred embodiment of the present invention will be described. As discussed in more detail herein, the invention comprises a method, system, and apparatus that permit a standard television system or other visual media such as print to transmit or incorporate supplementary data to the viewers/readers in the form of an optical signal (referred to herein as communications graphics or communication graphics overlay or optically readable image) along with the normal visual image. The present invention enables low speed one-way communication from a transmitting facility (e.g., TV station) to viewers. The invention offers a way to use existing and widely spread communication channels and easily adapt it for usage with different electronic devices—enabling them to receive information. The method and the apparatus enable receiving devices to receive information optically displayed on the screen, e.g., by locating the receiving device near to or directly on the TV screen to receive the optical information, or when working with print media, to receive incorporated supplementary data by sliding the apparatus over the printed communication graphics.

When using the apparatus with television, the invention generally comprises two main components, the transmitter and the receiver. The transmitter generally resides in the transmitting facility, e.g. a TV station. The communication from the transmitter is unidirectional from the TV station to any/all viewers that are tuned to the channel of the TV station. The TV station uses the hardware and software to modify the picture by superimposing the supplementary data (referred to herein as "communication graphics") over its regular TV signal.

In a preferred embodiment, the communication graphics comprise two or more fields, referred to herein as communication graphics fields, which are preferably implemented in a binary fashion (for example, light and dark). The computer controls switching of the fields' lightness/brightness and the information that needs to be transmitted is encoded by this brightness (or color) alteration.

The second main component is the receiver or receiving device. With implementation of the present invention, during the program transmission, in addition to the picture (e.g., a picture of the host reading the evening news), a part of the screen is overlaid with the communication graphics. The receiver reads the information in the communication graphics. During the supplemental data transmission, while the communication graphics is displayed, the optical reader of the receiver is positioned near or on the screen in order to receive the information transmitted. Once in position, the receiver decodes the message and processes it accordingly. When the supplemental data transmission is finished the communication graphics no longer needs to be displayed, revealing the original TV picture in fill.

Video overlaying is a process in which a first video signal is at least partially covered by a second video signal. Video overlay circuits are generally used to add text or graphics to an existing video stream, as known in the art. For example, many television receivers overlay the incoming video signal with an overlaying signal to display channel identification or control information in the corners of the video picture. Such information can be remotely or locally generated in a cable television set top receiver. Video overlaying can be either full or partial, such that the overlaying video either obscures the incoming video or appears transparent, allowing the incoming video to partially show through the overlaying video. Television signal processing systems are also known which produce a video signal which, when displayed by a display device, will produce a picture having a main image with an auxiliary image inserted within (picture-in-picture, or "PIP") or next to (picture out of picture, or "POP") the main image. The two displayed video images are typically associated with video signals derived from different video sources. Generally, an overlay switch combines the two sets of video signals into a set of combined video signals. Commercially available integrated circuits can be used to perform the above described functions, such as MC 1378 and TDA 3301, both manufactured by Motorola Semiconductor, Inc. The present invention envisions any such method of overlay or video mixing as known in the art to implement the methods of the invention. The video source and overlay video source may be combined at a transmitting facility or the overlay video source may be combined/inserted at a location remote from the transmitting facility.

Turning now to an embodiment of the invention, FIG. 1 shows a simplified layout of a transmitting facility, in this example a TV control room. A video source 1 (e.g., video player, video camera) and their corresponding video outputs 2 are provided.

In order to generate communication graphics, a computer 3 running control software, is used. Computer video signal 4, containing the communication graphics, is fed to the video mix unit 5 along with other video signals 2a, 2b, and 2c. Video mix unit 5 is used to mix incoming video signals (2a, 2b, 2c) and computer generated video signal. By overlaying the 4 with e.g. 2c, a composite video signal 6 is generated. This composite video, containing the original video overlaid with communication graphics is then transmitted to the viewer.

FIG. 2a shows the computer generated video output containing the communication graphics 11. Since the receiver can be positioned anywhere on the screen, the position of the graphics on the screen is not necessarily limited so it can be anywhere within the visible area of the screen (e.g., 12, 13, 14 or 15). Although, it is preferable to position the communication graphics in the least occupied part of the screen, depending on the video signal that the graphics is mixed with. In FIG. 2b the upper right corner would be the optimal solution because it does not interfere with the picture. The communication graphics can also be displayed along the top, bottom, or side edges while reducing the corresponding original video image, as is known in the art, thereby not obscuring any part of the original video image.

As shown in FIG. 3a the communication graphics preferably comprise two fields (the shape and size may vary) 21 and 22. Under the software control (software running on computer 3) fields 21 and 22 will change their brightness in an alternating fashion, becoming light (white) or dark (black) but always being opposite to one another.

In the present example, the field 21 is of opposite brightness than the field 22 and vice versa, as shown in FIG. 3b and FIG. 3c. The variation of communication graphics will cause the apparatus, when located near or on the screen (within view of the communication graphics), to register binary signals. For example, when communication graphics variant FIG. 3b is shown, a logical state '1', or HI is registered, whereas the variation shown in FIG. 3c will cause the apparatus, when pressed against the screen, to register a logical state '0', or LO. This "two field" approach is crucial part of presented invention because it solves numerous problems that appear when working with vast number of different TV set models, different display technologies, different picture brightness setups, refresh rates, picture quality, etc. The problem when faced with so many variables is the reference i.e., there is no true "black" or "white" when it comes to TV picture from different models—you always have different shades of gray, or of any color for that matter, largely depending on the brightness/contrast setup which varies with each device. What shade of gray (i.e., voltage level) should then be evaluated as logical state '0' or '1'? If fixed value is set to that limit, the range of devices this apparatus could work with would be inevitably narrowed. Therefore, we have instead of one sensor and one field—used two, enabling the apparatus to have "dynamic reference" within the communication graphics itself, and by comparing the inputs from two sensors precisely determine the information. This approach completely eliminates problems with different brightness/contrast/saturation settings enabling apparatus to be compatible with virtually all display devices and technologies.

It is important to understand that the invention is not limited to just two fields for the communication graphics. The transmission protocol can be expanded as known in the art for use with three or more fields, increasing the speed of the information transfer. As a specific example, with two cells you can encode numbers 0 or 1 as follows (unsing Black (B) and White (W) variable cells for the example): BW=0, WB=1. With 3 cells you have four combinations (ordinary you would have eight but since first two cells are preferably used for 'dynamic reference' they are opposite to one another which decreases the number of combinations). Accordingly, combinations beginning with BB or WW would be missing from the example to provide for 'dynamic refernce'. Therefore, the combinations would be as follows for this example: BW W=0, BW B=1,WB W=2, WB B=3. With four cells, an example may look something like the following: BW WW=0, BW WB=1, BW BB=2, BW BW=3, WB WW=4, WB WB=5, WB BB=6, WB BW=7.

In order to realize the data transfer, two main components are utilized, the transmitter and the receiver. The transmitter, for example, comprises the computer 3 in the transmitting facility control room that encodes the information it needs to transfer within the communication graphics. The receiver is designed to receive and process the information.

FIG. 4*a* shows the simplified layout and FIG. 4*b* an example of positioning the apparatus on the screen, over the communication graphics.

Turning now to the operation of the invention, while the communication graphics is displayed on TV screen, the receiving device is positioned in such a way that openings 41 on the case of the device are located over the communication graphics. The left opening is placed over the left field (21) of the communication graphics and the right opening is placed over the right field (22). In a preferred embodiment, the receiving device is removable positioned directly on the TV screen over the communication graphics using an attachment means such as suction cups or detachable (repositionable) adhesive 46.

When the apparatus is positioned in such a manner, the optical elements 42 will be able to 'see' the communication graphics fields. The signal from the optical elements 42 is fed to the analog comparator module 43, which, by comparing the analogue voltage levels from the optical elements 42, 'decides' what exactly are the optical elements looking at and sets the output accordingly. The module is designed in such way that its output can be set to either Vdd of Vss, that is HI or LO (1 or 0). Same task, comparison of voltage levels, can be done with different component but with the same purpose, e.g., one could use A/D converter and than compare digitalized values.

The output from the analog comparator module 43 is then fed to the microcontroller 44. Microcontroller (or any other integrated circuit capable of such task) is programmed to monitor the output from the comparator module 43 and seek the sequence that it can interpret as meaningful and valid information (a command). If the microcontroller 44 receives the sequence that will satisfy such conditions, it will interpret the information and act in accordance with intended purpose of the device that the apparatus is part of (compare the data to a unique code in the device and declare a winner of the TV show). The device may be powered by any suitable power source. Preferably, batteries 45 supply the current needed for the operation of the device.

FIG. 5*a* gives elementary schematics of the presented invention. It will be appreciated that the electronics, which will serve the same purpose, can be devised in many different ways but the scope of this invention is not the layout of the electronics but rather on the working principle of such data transfer.

FIG. 5*b* shows two variations of the communication graphics 51, 53 and the consequential voltage levels on the analog comparator module 43 output. If left communication graphic field is dark and right field is light as shown in 51 it will cause the analogue comparator module to set its output to HI state 52. If left communication graphic field is light and right field is dark as shown in 53 it will cause the analogue comparator module to set its output to LO state 54. It should be noted that the analogue comparator module would hold the corresponding state as long as the communication graphics variation is present on the screen.

FIG. 6 shows how by alternating the communication graphics variants the digital information is transferred.

At the beginning of the communication 60 there is no communication graphics overlaying the TV picture. Therefore, if the receiving device is pressed against the screen, it receives random, undefined signals. When the computer 3 in the TV control room is instructed, it will start to generate the communication graphics, which will be overlaid over the regular TV picture. If the information transferred starts with '1', generated graphics would look like that shown at 61. As long as this variant of the communication graphics is displayed on the screen, the voltage level on the comparator module 43 output will remain the same, so, if the computer 3 'holds' the graphics for 60 ms, the comparator module 43 output will be HI for 60 ms.

At 62, the communication graphics will change, and so will the output. This time the computer 3 will generate communication graphics variant 53 which will cause a LO voltage level on the comparator module 43 output. In the example shown, the computer 3 will 'hold' this variant of communication graphics for 100 ms before switching it again.

When the sequence of alternations 61,62,63,64, has been played out, the computer 3 will finish the communication by removing the communication graphics out of the TV picture. With the communication graphics removed 65, the receiver, if pressed against the screen, will receive random, undefined signals. 66 displays a data stream that will be produced by a sequence of operations presented in the previous example.

The output of the analog comparator module 43 is connected to the microcontroller 44 input, as shown in FIG. 5*a*, and 44 is programmed to monitor and analyze the input. If the microcontroller 44 receives such a stream that would match pre-programmed conditions, it will interpret the stream as valid information.

When using the apparatus with print media there is no need for transmitter since the communication graphics is printed on the paper. Usage of the apparatus is slightly changed—the user has to slide the apparatus over the printed communication graphics in order for apparatus to be able to 'read' the printed information FIG. 8*a*.

FIG. 7 shows an example of communication graphics layout prepared for print media. It should be noted that 70 is in fact an array consisting of communication graphics variants 51 and 53 (FIG. 7—expanded view) where by varying the psychical length of the printed communication graphics variants one actually varies the duration of logical states generated on the analog comparator module output 43. Unlike with TV application where display duration of the communication graphic variants directly translates to logical state of the same duration (FIG. 6), when using the apparatus with print media duration of the logical states is directly dependant of sweeping speed, that is, if the apparatus is swept faster (FIG. 8b) over the communication graphics array—logical states, and therefore the whole communication will be shorter (i.e., condensed) and vice versa (FIG. 8c). Microcontroller (or similar electronics capable of such task) needs to be programmed in such way to relay on relative timing i.e. to analyze received stream and extract the information regardless of the speed it has been received on.

The apparatus may preferably be equipped with a suitable light source 91 (LED or similar) in order to provide light to be reflected of the surface (paper) to sensors enabling the apparatus to differentiate between light and dark surfaces. Light source may be implemented in various ways; FIG. 9a and FIG. 9b depict just some possible solutions.

The information transmitted may be used in a variety of implementations as illustrated in the following examples. These examples should not be construed as limiting.

EXAMPLE 1

Interactive Marketing Campaign/Prize Winning Interactive Game

In this example, a transmitting facility can send "prize winning/gaming" supplementary data as part of its regular programming (e.g., a game show, promotional campaign, and the like). The viewers could compete for prizes by using the receiving device along with the particular game show.

In a specific example, a company may launch a promotional campaign by distributing receiving devices (customized with the company's name/logo) to a targeted audience preferably using one of the several ways of distribution (co-packing, newspaper, outlets, etc.) depending on the intended reach, target audience and the size of the campaign. The receiving devices may be given away for free, as a co-packed gift, or be sold (e.g. by lottery). The audience is educated through media (TV, newspapers, radio) on how to use the receiver and informed of all aspect of the game i.e. prizes, how to participate, etc.

The company works with the transmitting facility in sending supplementary data along with a program or a plurality of programs, commercials, infomercials, or the like. As part of the game, the viewers are encouraged to watch a certain part of the programming or to 'collect' the commercials in order to win prizes. If the viewers meet the requirements, the receiver will give different visual and audible signals and alert the viewer that he is eligible for the prize. All the viewers/players that meet the required criteria enter a drawing for a prize/s, or, depending on the type of the campaign, they can exchange their receivers for something (i.e. tickets for a concert, free products, etc.).

The receiver becomes the "promotional vehicle" playing the central role in the campaign/game. The receiver preferably comprises a microcontroller, photo sensors, speaker, LED and it is battery powered. It can be molded in different shapes and colors, depending on the needs of the promotion (i.e. bottle cap with logo for the soft drink company). The device is preferably activated by removal of the protecting folium on the bottom side and removably attached in the corner of the TV set screen by self adhesive tape or suction. During the game period of the campaign, the TV station broadcasts certain codes that are incorporated within the picture (supplementary data), and the microcontroller inside the receiver reads and decodes these codes, therefore enabling the receiver to 'know' what is the viewer/consumer watching. Depending on the rules of the game the viewer/consumer has to watch a certain part of the programming to 'feed' his receiver, and if he follows the instructions the receiver will signal (e.g., visual or audio signals like flashes, sounds, LCD displays, or the like) informing the viewer/consumer that he might be one of the lucky winners.

Depending on the specific game, the viewer/consumer, after meeting the required conditions (e.g., seeing 10 commercials or 8 hours of certain show within a week) can call in and leave his details, or exchange the receiver for a prize. In an alternate embodiment, the receiver further includes a means for communication with the company, transmitting facility or other third-party central station. Such communication can include a modem to send data. Alternately, a removable medium can be provided (e.g., CD, digital storage means, magnetic card) which can be sent to the company to claim the prize.

The promotional campaign may also be applied to the Internet. The participants can be encouraged to surf the Web and visit certain Web pages in order to 'feed' the receiver that they have attached to their monitors or collect "miles", hunt for "treasure", etc. The communication graphics, when using apparatus/method with internet may preferably be incorporated within web pages in the form of banners or popups.

Moreover, the receiver could be implemented with print media promotion campaign as well. As an example, a car company could distribute the device molded into small toy cars as a part of the promotion for the new make. Participants would have to read a certain print media and collect "miles" by sweeping the toy cars over the printed communication graphics.

Accordingly, companies who wish to make new, innovative promotional campaigns and involve the consumers in new, interactive, prize-winning competitions could utilize the invention. TV Stations that wish to increase their share and ratings through the undeniable appeal may also wish to incorporate the invention in their operations. Using the invention as part of an interactive show, TV stations can selectively target the part of their own program and significantly increase the ratings. Viewers/consumers who wish to participate in a prize winning interactive game show and get rewarded just for watching the right channel at the right time would benefit by using the invention.

EXAMPLE 2

Special Offers Acquired by Watching Certain TV Channels

By viewing specific TV programs or commercials viewer is able to receive supplementary data with a special offer—savings on merchandise sold in the stores. Apparatus, molded in a suitable shape would be a sort of "TV coupon" providing discounts to the viewers who participate and follow the rules of the promotion. TV coupons would preferably be given in stores or received after a certain purchase. Participating TV stations would air specific commercials with supplementary data or air supplementary data during shows such as TV shop or similar. Once this supplementary data is received by the device (depending on the promotion, one or more complimentary data would have to be captured by the device) it would display confirmation of the offer. (e.g., by switching on a light on the device or displaying a certain code on the display of the device) This activated device can be exchanged in the store for a free gift or specific discount on merchandise.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

It should be understood that the examples and embodiments described herein are for illustrative purposes only and that various modifications or changes in light thereof will be suggested to persons skilled in the art and are to be included within the spirit and purview of this application. The present invention has been described with reference to preferred embodiments. Such variations include communication area/fields of any color and/or shape and/or size; communication area/fields placed anywhere within the visible screen area; one, two or more communication fields in the communication area—using, one, two or more optical elements in the receiving device; using a CCD in lieu of the optical elements discussed; the function of the microcontroller proposed is integrated in some other part of the device, i.e. the main microprocessor or any other IC that drives the device. Furthermore, in addition to TV, Cable, Satellite, the invention further includes any display, such as the screen of personal computers, ATMs, kiosks, and the like. Binary information may also be displayed as part of print media.

The invention claimed is:

1. A method for generating a video signal having supplementary information therein for coupling to a display device, said method comprising:
 (a) receiving supplementary information;
 (b) converting the supplementary information into binary-coded data;
 (c) constructing an optically readable image of at least two dynamically opposed data cells corresponding to two logical states that represent the binary-coded data, such that a logical 0 of binary-coded data is represented by cell one having a first optical representation and cell two having a second optical representation, and a logical 1 of binary-coded data is oppositely represented by cell one having the second optical representation and cell two having the first optical representation, wherein the dynamically opposed data cells allow for dynamic reference with respect to each other; and
 (d) generating a supplementary video signal comprising an image stream representative of said binary-coded data by switching the optically readable image between logical states to binarily represent the supplementary information, wherein the supplementary video signal is suitable for coupling to a display device for visibly displaying the image stream comprising the optically readable image switching between logical states overlaid on the display device.

2. The method of claim 1 further comprising combining a source video signal and the supplementary video signal to provide an output video signal suitable for coupling to a display device for producing an underlying image comprising a first portion representative of said source video signal and an overlaid image comprising a visibly displayed second portion representative of said supplementary video signal.

3. The method of claim 1 wherein the first and second optical representations respectively comprise approximate brightness variations.

4. The method of claim 1 wherein the first and second optical representations respectively comprise approximate color variations.

5. The method of claim 1 further comprising the step of optically decoding the optically readable image visibly displayed on the display device to ascertain the supplementary information.

6. The method of claim 5 wherein the optically readable image visibly displayed on the display device is optically decoded by aligning optical sensors with the data cells and comparing the data from the optical sensors.

7. The method of claim 6 further comprising outputting decoded data representative of the supplementary information.

8. The method of claim 7 further comprising processing the supplementary information.

9. The method of claim 1 wherein the supplementary video signal is formatted as a multimedia signal for transmission by radio broadcast, satellite, cable, computer network, or Internet.

10. The method of claim 1 wherein the supplementary video signal is transmitted live or pre-recorded.

11. The method of claim 2 wherein the second portion representative of said supplementary video signal visibly overlays an area of the first portion representative of said source video signal on the display device.

12. The method of claim 11 wherein the second portion is located on a least occupied part of the source video signal on the display device, thereby avoiding visual interference with the source video signal.

13. The method of claim 2 wherein the second portion representative of said supplementary video signal located in an area visually outside the first portion representative of said source video signal on the display device, thereby avoiding visual interference with the source video signal.

14. The method of claim 2 wherein the second portion representative of said supplementary video signal is located in an area visually outside the first portion representative of said source video signal on the display device by first reducing the image size of the source video signal, thereby avoiding visual interference with the source video signal.

15. The method of claim 1 further comprising additional data cells, thereby increasing the bandwidth of data being transferred.

16. The method of claim 15 wherein the first two data cells are encoded with opposite optical representations, thereby providing the dynamic reference with respect to each other.

17. A method of interacting with viewers for a promotional campaign, comprising transmitting supplemental information associated with the promotional campaign in accordance with the method of claim 1, the promotional campaign comprising one or more promotions of prizes, coupons, discounts, tickets, and lotteries.

18. The method of claim 17 wherein the interaction comprises collecting the supplemental information by receiving and optically decoding the optically readable image at the display device with a receiver to ascertain the supplementary information.

19. The method of claim 18 wherein the supplemental information is collected for a predetermined length of time in order to satisfy the promotional campaign.

20. The method of claim 18 further comprising providing an output indication on the receiver upon collection of a predetermined amount of supplemental information.

21. The method of claim 20 wherein the output indication comprises one or more of audible or visual indicators.

22. The method of claim 20 further comprising transmitting an acknowledgement from the receiver to a third party upon collection of a predetermined amount of supplemental information.

23. The method of claim 22 wherein the third party provides the promotion in return for the acknowledgement.

24. The method of claim 18 further comprising exchanging the receiver after supplemental information is collected for the promotion.

25. The method of claim 18 wherein the supplementary video signal is formatted as a multimedia signal for transmission by radio broadcast, satellite, cable, computer network, or Internet.

26. A system for generating a video signal having supplementary information therein for coupling to a display device, comprising:
   means for receiving supplementary information;
   means for converting the supplementary information into binary-coded data;
   means for constructing an optically readable image of at least two dynamically opposed data cells corresponding to two logical states that represent the binary-coded data, such that a logical 0 of binary-coded data is represented by cell one having a first optical representation and cell two having a second optical representation, and a logical 1 of binary-coded data is oppositely represented by cell one having the second optical representation and cell two having the first optical representation, wherein the dynamically opposed data cells allow for dynamic reference with respect to each other; and
   means for generating a supplementary video signal comprising an image stream representative of said binary-coded data by switching the optically readable image between logical states to binarily represent the supplementary information, wherein the supplementary video signal is suitable for coupling to a display device for visibly displaying the image stream comprising the optically readable image switching between logical states overlaid on the display device.

27. The system of claim 26 further comprising means for combining a source video signal and the supplementary video signal to provide an output video signal suitable for coupling to a display device for producing an underlying image comprising a first portion representative of said source video signal and an overlaid image comprising a visibly displayed second portion representative of said supplementary video signal.

28. A system for combining supplementary information into a video signal for coupling to a display device, comprising:
   digital converter for converting supplementary information into binary-coded data by constructing an optically readable image of at least two dynamically opposed data cells corresponding to two logical states that represent the binary-coded data, such that a logical 0 of binary-coded data is represented by cell one having a first optical representation and cell two having a second optical representation, and a logical 1 of binary-coded data is oppositely represented by cell one having the second optical representation and cell two having the first optical representation, wherein the dynamically opposed data cells allow for dynamic reference with respect to each other;
   signal generator for generating a supplementary video signal comprising an image stream representative of said binary-coded data by switching the optically readable image between logical states to binarily represent the supplementary information; and
   video mixer for combining a source video signal and the supplementary video signal to provide an output video signal suitable for coupling to a display device for producing an underlying image comprising a first portion representative of said source video signal and an overlaid image comprising a visibly displayed second portion representative of said supplementary video signal.

29. A method for transmitting and receiving supplementary information in a video signal, said method comprising:
   (a) receiving supplementary information;
   (b) converting supplementary information into binary-coded data;
   (c) constructing an optically readable image of at least two dynamically opposed data cells corresponding to two logical states that represent the binary-coded data, such that a logical 0 of binary-coded data is represented by cell one having a first optical representation and cell two having a second optical representation, and a logical 1 of binary-coded data is oppositely represented by cell one having the second optical representation and cell two having the first optical representation, wherein the dynamically opposed data cells allow for dynamic reference with respect to each other;
   (d) generating a supplementary video signal comprising an image stream representative of said binary-coded data by switching the optically readable image between logical states to binarily represent the supplementary information, wherein the supplementary video signal is suitable for coupling to a display device for visibly displaying the image stream comprising the optically readable image switching between logical states representative of said supplementary video signal overlaid on the display device;
   (e) combining a source video signal and the supplementary video signal to provide an output video signal suitable for coupling to a display device for producing an underlying image comprising a first portion representative of said source video signal and an overlaid image comprising a visibly displayed second portion representative of said supplementary video signal;
   (f) receiving and displaying said output video signal at said display device; and
   (g) optically decoding the visibly displayed optically readable image to ascertain the supplementary information.

30. An apparatus for reading two-dimensional code contained in a video signal displayed on a display device, comprising:
   an optical reader for capturing visibly displayed optically readable image carrying supplementary information combined with a video signal, wherein the visibly displayed optically readable image comprises at least two dynamically opposed data cells corresponding to two logical states that represent the binary-coded data, such that a logical 0 of binary-coded data is represented by cell one having a first optical representation and cell two having a second optical representation, and a logical 1 of binary-coded data is oppositely represented by cell one having the second optical representation and cell two having the first optical representation, wherein the dynamically opposed data cells allow for dynamic reference with respect to each other; and a decoder for decoding the optically readable image, the decoder having optical sensors aligned with the two dynamically opposed data cells for reading the corresponding two logical states that represent the binary-coded data overlaid on a display device.

31. The apparatus of claim 30 wherein the apparatus is removeably attachable to the display device.

32. The apparatus of claim 30 wherein the reader comprises at least two optical sensors for alignment with the at least two dynamically opposed data cells of the optically readable image on the display device to allow for dynamic reference with respect to each other.

33. The apparatus of claim 32 wherein the decoder comprises a comparator for comparing the data from the optical sensors to determine the logical state represented by the data cells.

34. The apparatus of claim 33 further comprising an output device for outputting decoded data representative of the supplementary information.

35. The apparatus of claim 34 further comprising a processor for controlling output functions based on the supplementary information.

36. An apparatus for reading two-dimensional code contained in printed matter, comprising:

an optical reader for capturing an optically readable printed image carrying supplementary information arranged visibly along a length of the printed matter, wherein the printed image comprises a plurality of sets of at least two dynamically opposed data cells corresponding to two logical states that represent the binary-coded data, such that a logical 0 of binary-coded data is represented by cell one having a first optical representation and cell two having a second optical representation, and a logical 1 of binary-coded data is oppositely represented by cell one having the second optical representation and cell two having the first optical representation, wherein the dynamically opposed data cells allow for dynamic reference with respect to each other; and a decoder for decoding the optically readable image by sliding it along the length of the printed matter to receive the data as a stream, the decoder having optical sensors for alignment with the two dynamically opposed data cells for reading the corresponding two logical states that represent the binary-coded data.

37. A method for communicating supplementary information in printed matter, said method comprising:

(a) converting supplementary information into binary-coded data by constructing an optically readable printed image arranged visibly along a length of the printed matter carrying supplementary information, wherein the printed image comprises a plurality of sets of at least two dynamically opposed data cells, such that a logical 0 of binary-coded data is represented by cell one having a first optical representation and cell two having a second optical representation, and a logical 1 of binary-coded data is oppositely represented by cell one having the second optical representation and cell two having the first optical representation, wherein the dynamically opposed data cells allow for dynamic reference with respect to each other;

(b) printing said optically readable printed image along the length of the printed matter; and (c) optically decoding the optically readable printed image to ascertain the supplementary information by sliding a decoder along the length of the printed matter to receive the data as a stream, the decoder having optical sensors for alignment with the two dynamically opposed data cells for reading the corresponding two logical states that represent the binary-coded data.

* * * * *